(12) United States Patent
Abair

(10) Patent No.: US 6,974,146 B2
(45) Date of Patent: Dec. 13, 2005

(54) ADJUSTABLE HITCH AND METHOD OF USE

(76) Inventor: Rodney Abair, 13538 W. 4th Rd., Plymouth, IN (US) 46563

( * ) Notice: Subject to any disclaimer, the term of this patent is extended or adjusted under 35 U.S.C. 154(b) by 0 days.

(21) Appl. No.: 10/630,395

(22) Filed: Jul. 30, 2003

(65) Prior Publication Data

US 2004/0021292 A1   Feb. 5, 2004

Related U.S. Application Data

(60) Provisional application No. 60/400,427, filed on Aug. 1, 2002.

(51) Int. Cl.[7] .............................................. B60D 1/44
(52) U.S. Cl. ................... 280/470; 280/479.1; 280/482; 280/491.2
(58) Field of Search ............................. 280/468, 469, 280/470, 482, 491.2, 479.1; 414/563

(56) References Cited

U.S. PATENT DOCUMENTS

| | | | |
|---|---|---|---|
| 3,169,782 A | 2/1965 | Columbus | |
| 3,178,203 A * | 4/1965 | Elliott | 280/470 |
| 3,279,825 A | 10/1966 | Boutwell | |
| 3,622,182 A | 11/1971 | Grosse-Rhode | |
| 4,000,911 A * | 1/1977 | Weber | 280/468 |
| 4,057,265 A * | 11/1977 | Grace | 280/468 |
| 4,153,132 A * | 5/1979 | Biedebach | 180/420 |
| 4,265,465 A | 5/1981 | Deitrich, Sr. | |
| 4,368,899 A | 1/1983 | Smalley et al. | |
| 4,447,071 A | 5/1984 | Kaplan | |
| 4,744,583 A | 5/1988 | Blackwood | |
| 4,773,667 A | 9/1988 | Elkins | |
| 5,236,214 A | 8/1993 | Taylor | |
| 5,401,047 A | 3/1995 | Dettling, Jr. | |
| 5,580,088 A | 12/1996 | Griffith | |
| 5,941,550 A | 8/1999 | Szczypski | |
| 5,984,613 A * | 11/1999 | Motilewa | 414/462 |
| 6,042,135 A | 3/2000 | Ross | |
| 6,220,618 B1 * | 4/2001 | Smith et al. | 280/447 |
| 6,234,511 B1 | 5/2001 | Gentner et al. | |
| 6,402,178 B1 | 6/2002 | Ifflaender | |
| 6,585,280 B1 * | 7/2003 | Wiers | 280/468 |
| 6,634,666 B2 * | 10/2003 | Shilitz et al. | 280/470 |
| 2002/0020988 A1 | 2/2002 | Kleb et al. | |

FOREIGN PATENT DOCUMENTS

EP          0 136 017          3/1985

* cited by examiner

*Primary Examiner*—Kevin Hurley
(74) *Attorney, Agent, or Firm*—Woodard, Emhardt, Moriarty, McNett & Henry LLP

(57) ABSTRACT

Provided is an adjustable trailer hitch assembly and method of use that permits one person to controllably move the hitch within a plane of defined boundaries. Trailer hitch assembly includes one or more longitudinally extending assemblies for mounting under a vehicle, a cross-bracket assembly attached substantially perpendicularly with telescoping assemblies, a receiver portion slidable in said cross-bracket assembly, and a ballmount fixed with said receiver portion with a pin. Telescoping assemblies and cross-bracket assembly include control mechanisms, which may include motors and worm gear drives, to move the receiver portion longitudinally and latitudinally, respectively, thereby moving the ballmount and hitch ball within a predefined plane. An integral safety latch system is also provided.

17 Claims, 17 Drawing Sheets

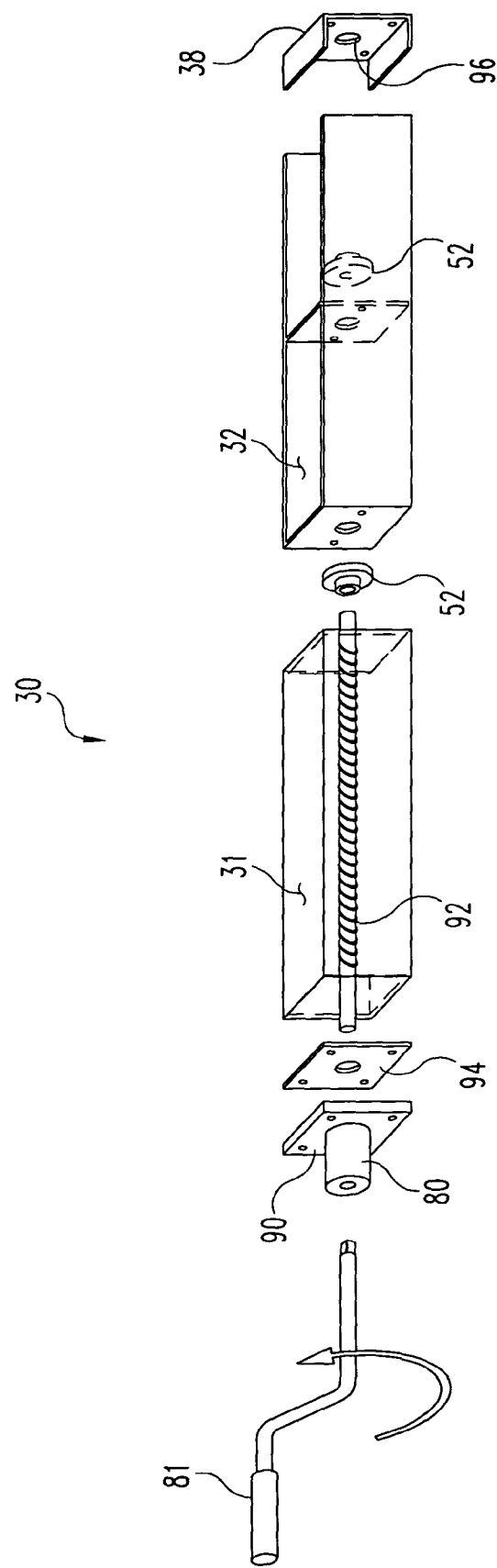

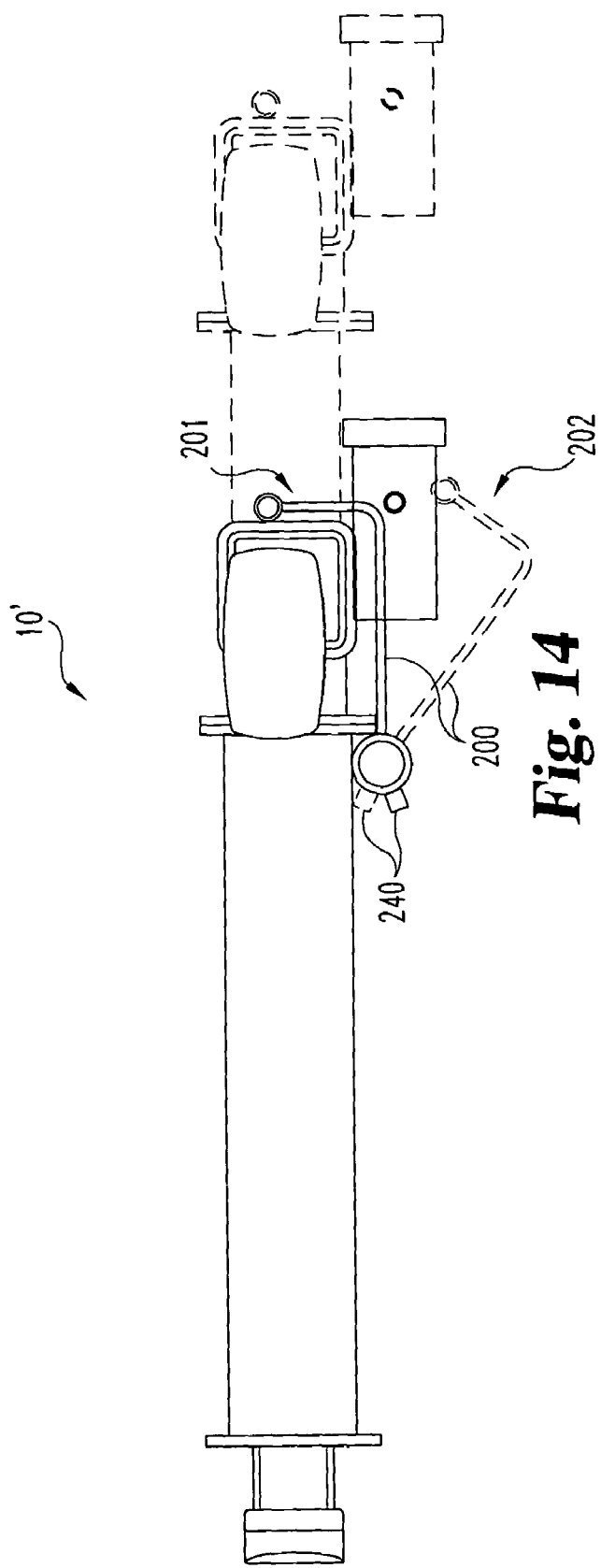

ADJUSTABLE HITCH AND METHOD OF USE

This application claims the benefit of Provisional Application Ser. No. 60/400,427, filed Aug. 1, 2002.

FIELD OF THE INVENTION

The invention is directed generally to a trailer hitch, and more particularly to an adjustable trailer hitch for a vehicle.

BACKGROUND OF THE INVENTION

A trailer hitch for a vehicle typically comprises a hitch ball attached to a ballmount sized and configured to be received within a receiver at the rear of the vehicle. The trailer hitch is normally positioned out of the sight of the vehicle driver, such that it is difficult if not nearly impossible for the driver to align the hitch properly relative to the tongue of a trailer. For this reason, usually one person drives the vehicle and another person is positioned at the tongue of the trailer to direct the driver regarding placement of the hitch relative to the trailer. Alternatively, the driver may repeatedly enter and exit the vehicle to view the hitch connection in an effort to properly position the vehicle relative to the trailer.

What is needed in the art is a trailer hitch that allows a single person to easily and reliably connect the tongue of a trailer to the hitch.

SUMMARY OF THE INVENTION

Provided is an adjustable trailer hitch, which in one embodiment comprises a longitudinally extending assembly comprising a stationary portion adapted to be fixed to a vehicle, and a translating portion translatingly attached to the stationary portion and adapted to translate longitudinally relative to the stationary portion. In this embodiment a first control mechanism is operatively attached to the longitudinally extending assembly to controllably translate the translating portion longitudinally relative to the stationary portion. Also, a latitudinal cross bracket assembly is attached to the translating portion such that the latitudinal cross bracket assembly translates longitudinally when the translating portion translates longitudinally. And a hitch receiver portion is translatingly attached to the cross bracket assembly and adapted to translate latitudinally relative to the cross bracket assembly. Finally, a second control mechanism is operatively attached to the receiver portion to controllably translate the receiver portion latitudinally relative to the cross bracket assembly.

Other embodiments and modifications to the above embodiment are provided herein.

BRIEF DESCRIPTION OF THE DRAWINGS

FIG. 4 is an isometric exploded view of a telescoping assembly according to one embodiment of the invention.

FIG. 14 is a side view of the adjustable trailer hitch assembly 10 of FIG. 5A, with the safety latch in both latched and unlatched (dashed lines) positions.

DETAILED DESCRIPTION OF PREFERRED EMBODIMENTS

Figure 1:
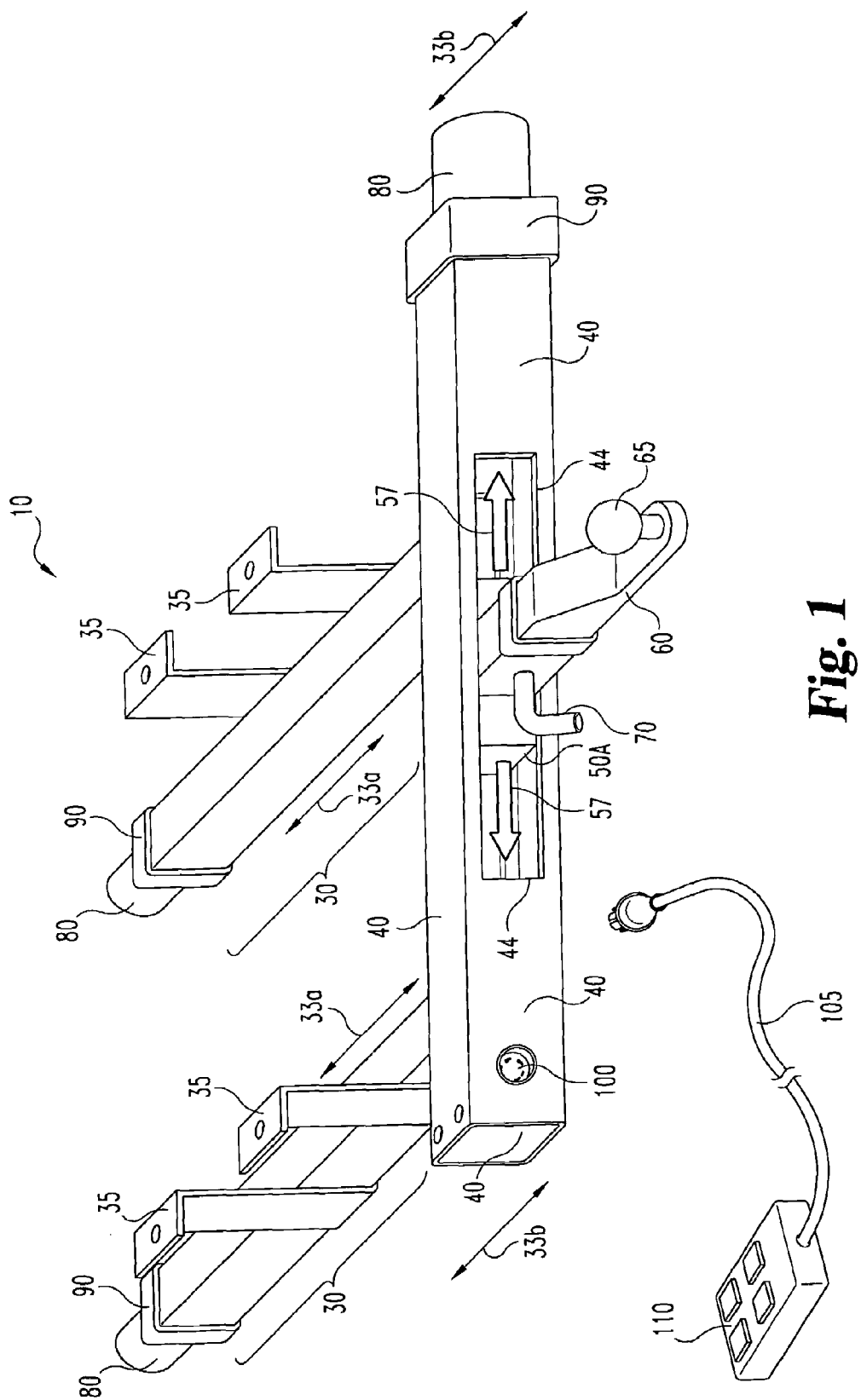
FIG. 1 is an isometric view of an adjustable trailer hitch assembly according to one embodiment of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, and alterations and modifications in the illustrated device, and further applications of the principles of the invention as illustrated therein, are herein contemplated as would normally occur to one skilled in the art to which the invention relates.

The present invention is directed to adjustable trailer hitches, and is described below primarily in the context of adjustable trailer hitch assemblies using control mechanisms comprising electric motors and worm gear drives, particularly 12 volt motors. However, other embodiments covered by the invention simply substitute for electric motors and worm gear drives any suitable power source means, including, for example, 24, 110 or 220 volt motors, hydraulic motors, power-take-off mechanisms, or hand cranks, and any suitable power transmission means, including, for example, worm gear drives, recirculating ball screw drives, rack and pinion mechanisms, and the like. Hereafter the invention is described with respect to an example embodiment, 12-volt motors driving worm-gear mechanisms.

Referring now to FIG. 1, an isometric view of an adjustable trailer hitch assembly 10 according to one embodiment of the invention is shown. Trailer hitch assembly 10 includes two parallel telescoping assemblies 30 that are typically mounted under a vehicle 20 (shown in FIGS. 16A–C) using brackets 35. A cross-bracket assembly 40 is attached substantially perpendicularly to the telescoping assemblies 30 and includes a receiver portion 50A and a ballmount 60 fixed to the receiver portion 50A with a pin 70. Ballmount 60 may include a hitch ball 65 and is adapted to be removably inserted into receiver portion 50A. Preferably, a removable ballmount 60 permits interchangeable use of ballmounts having hitch balls 65 of various sizes. Cross-bracket assembly 40 includes a motor 80, a worm gear drive 90, and a plug receptacle 100 for receiving an electrical cord 105 for a controller 110 that can be manipulated by a user via buttons, switches or the like to cause longitudinal and latitudinal movement of the receiver portion 50A as described herein. In one embodiment the motor 80 is a 12-volt motor rated at 1,500 pounds, and is powered by a vehicle's 12-volt electrical system. Such a motor 80 is available from Atwood Mobile Products.

Worm gear drives 90 and motors 80 are attached to the ends of telescoping assemblies 30 distal cross-bracket 40. The stationary portions 31 (see FIG. 4) of telescoping assemblies 30 are fixedly attached with brackets 35 to a vehicle and do not move relative to the vehicle 20 (shown in FIGS. 16A–C). Rather, translating portions 32 (see FIG. 4) of telescoping assemblies 30 are telescopically attached with stationary portions 31, and extend and retract in the directions depicted by arrows 33a (see FIG. 1) by any distance within the maximum extension and retraction range determined by the geometry and structure of telescoping assemblies 30. In the embodiments shown in FIGS. 1 and 5A the telescoping assemblies 30 and 30' extend and retract in unison. Telescoping assemblies 30 and 30' may be formed from any suitably strong materials, but steel weldments are preferred, designed per the conventional strength requirements of the desired hitch class (e.g., a Class I, II or III hitch).

The translating portions 32 (see FIG. 4) of telescoping assemblies 30 are also attached, substantially perpendicularly, to cross-bracket 40, and cause cross-bracket 40 to likewise extend and retract, as depicted by arrows 33b (see FIG. 1). In one embodiment, cross-bracket 40 defines a window 44 through which the receiver portion 50A projects. The boundaries of window 44 define the maximum lateral movement of receiver portion 50A within cross-bracket 40, as depicted by arrows 57. Cross-bracket 40 may be formed from any suitably strong material, such as steel. A worm gear drive 90 and motor 80 are attached to one end of cross-bracket 40, and serve to laterally move, or slide, receiver portion 50A any lateral distance within a range, the maximum possible range being defined by, for instance, the geometry of window 44. Plug receptacle 100 is adapted to be operatively connected with controller 110.

All motors 80, and thus all longitudinal movements 33 and latitudinal movements 57, are controllable by, for instance, controller 110, which may include conventional switches and/or buttons, as known by one of ordinary skill in the art. Alternatively, plug receptacle 100 could be replaced with a receiver of electromagnetic signals (not shown), and controller 110 could be replaced with a remote control (not shown) that emits electromagnetic signals for controlling motors 80. Alternatively, controller 110 could be mounted to, and/or integral with, trailer hitch assembly 10 or vehicle 20 (shown in FIGS. 16A–C).

Figure 2:
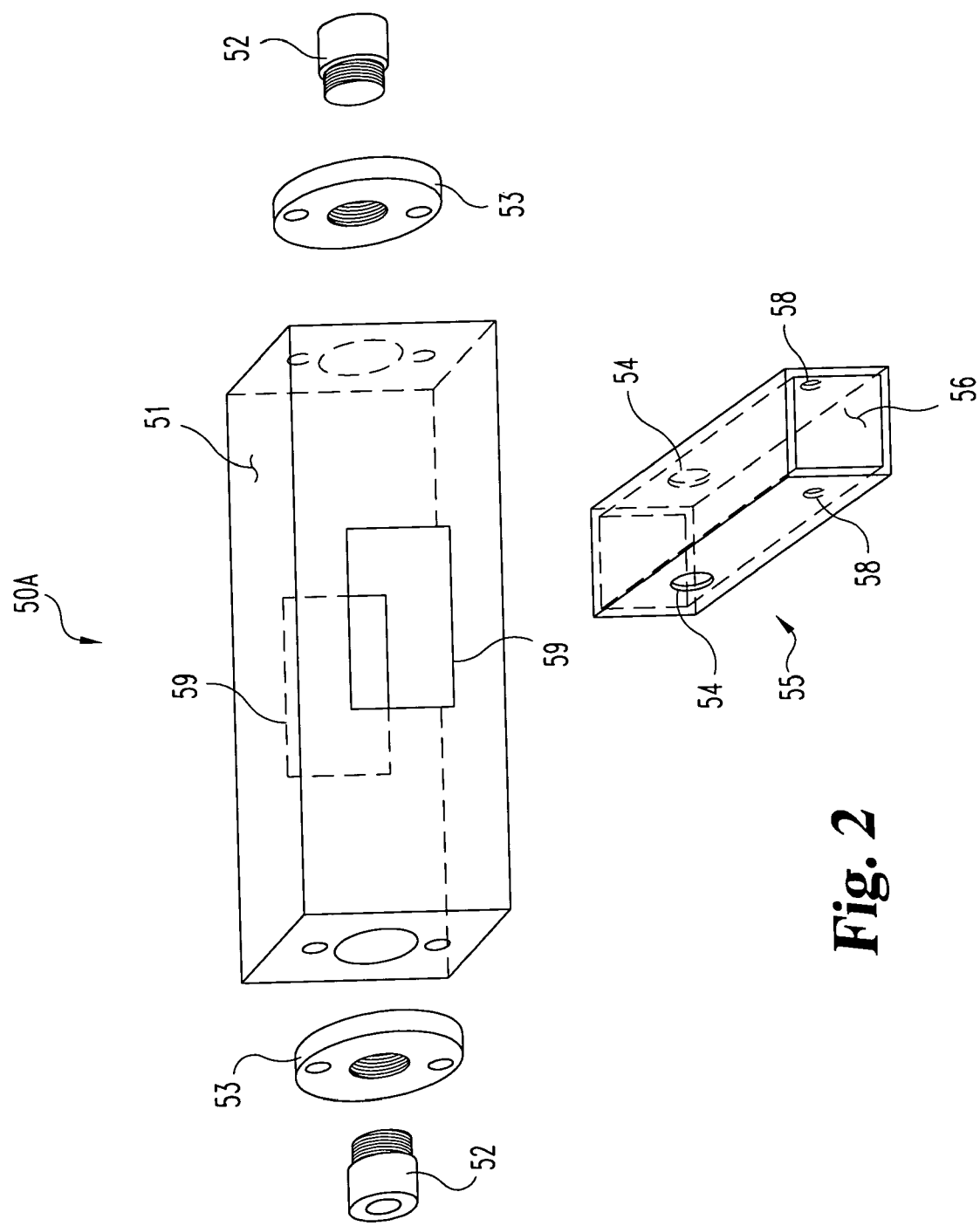
FIG. 2 is an isometric exploded view of a receiver portion assembly according to one embodiment of the invention.

FIG. 2 is an isometric exploded view of a receiver portion 50A according to one embodiment of the invention. Receiver portion 50A includes a receiving member 55 defining an opening 56 for slidably engaging a conventional ballmount 60 (shown in FIG. 1). Receiving member 55 further defines apertures 58 for receiving and removably engaging a conventional receiver pin 70 (shown in FIG. 1), and clearance holes 54 for clearing a worm drive gear 92 (shown in FIG. 3). Receiver portion 50A may include a translating body 51, defining openings 59 into which receiving member 55 is fixed, for instance by welding. As with the other portions of trailer hitch assembly 10, receiver portion 50A may be formed from any suitably strong materials, such as steel.

Receiver portion 50A may further include driven gears 52, adapted to be driven by a worm drive gear 92 (shown in FIG. 3), and bulkheads 53 mounted to lateral sides of translating body 51, where bulkheads 53 receive driven gears 52. Driven gears 52 are adapted such that when mating worm drive gear 92 (shown in FIG. 3) rotates within driven gears 52, receiver portion 50A moves laterally left or right relative to said drive gear 92, depending on the direction of rotation of said drive gear 92.

Figure 3:
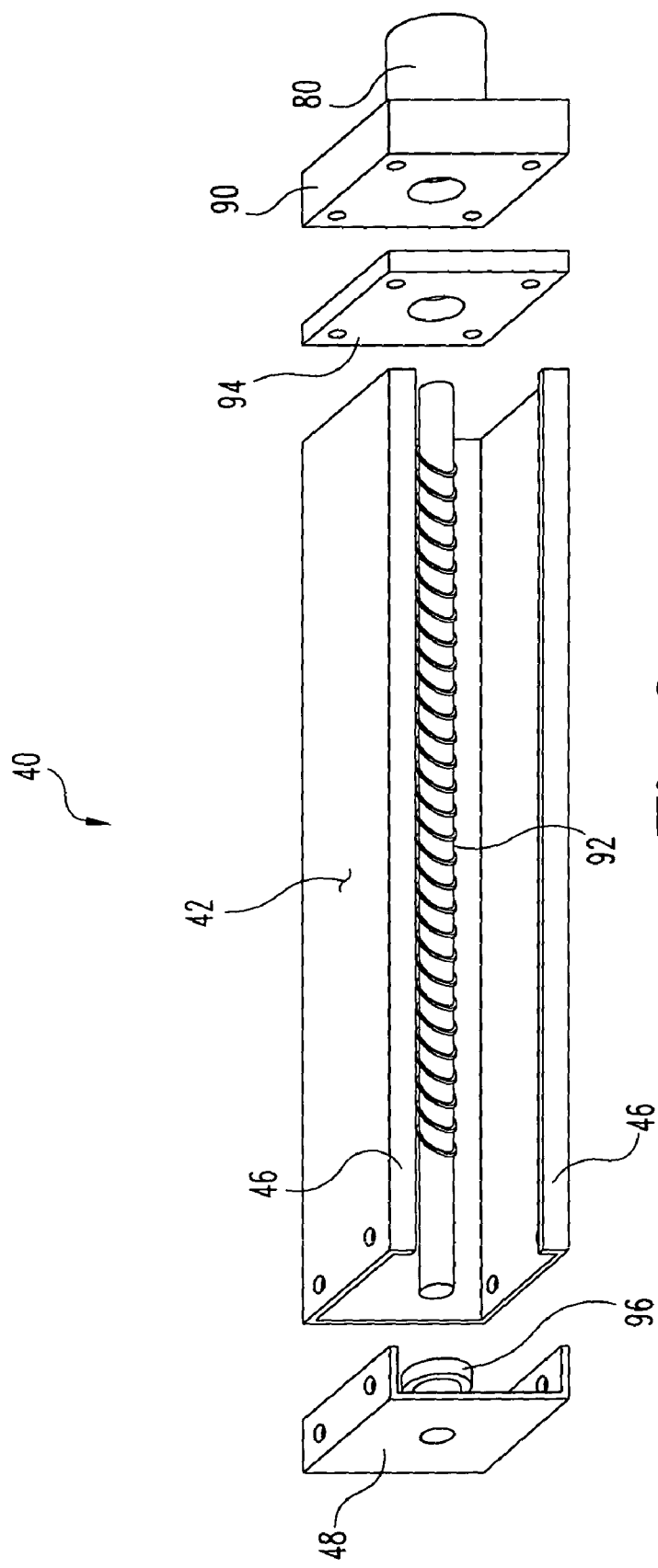
FIG. 3 is an isometric exploded view of a cross-bracket assembly according to one embodiment of the invention.

FIG. 3 is an isometric exploded view of a cross-bracket assembly 40 according to one embodiment of the invention. Cross-bracket assembly 40 comprises a body 42 defining a slot 46 (similar to window 44 shown in FIG. 1, but without lateral sides), and an end cover 48 attached to a first lateral end. A motor 80 and worm gear drive 90 are attached with a plate 94 to a second lateral end opposite the first lateral end. Plate 94 guides and/or receives a driving worm gear 92. Worm gear 92 extends from the worm gear drive 90 at the second lateral end of body 42 to a worm gear bearing 96 attached with end cover 48 at the first lateral end of body 42. Through worm gear drive 90, motor 80 rotates driving worm gear 92 about its longitudinal axis in both rotational directions, thus driving the driven gears 52 in portion 50A (shown in FIG. 2) left and right, and thus laterally moving receiver portion 50A left and right relative to cross-bracket assembly 40. Motors 80, gear drives 90, plates 94, and end covers 48 may be attached to their respective mating parts with any suitable fasteners, such as bolts, to permit disassembly and service of internal components, or may be permanently affixed via welding, etc., where disassembly is not required. Likewise, telescoping assemblies 30 may be attached to cross-bracket assembly 40 via suitably strong fasteners or via welding.

FIG. 4 is an isometric exploded view of a telescoping assembly 30 according to one embodiment of the invention. Telescoping assembly 30 includes a stationary portion 31 and a translating portion 32. The stationary portion 31 is attachable to a vehicle 20 (shown in FIGS. 16A–C) via., e.g., brackets 35 (shown in FIG. 1). A motor 80 and worm gear drive 90 are attached to the stationary portion 31 via a plate 94. The worm drive system in telescoping assembly 30 may be similar to that in cross-bracket 40. Motor 80, through gear drive 90, rotates worm drive gear 92, thus longitudinally translating driving driven gears 52 mated with worm drive gear 92. Alternatively or in conjunction with motor 80, a manual drive system may be provided, whereby the worm drive gear 92 can be rotated manually be an operator, for instance by a hand crank 81. Such a manual drive system could also be provided to operate cross-bracket assembly 40 (shown in FIG. 3). Driven gears 52 are fixedly mated with the translating portion 32 of telescoping assembly 30, such that translating portion 32 translates along with driven gears 52 when worm drive gear 92 rotates. Translating portion 32 thus translates longitudinally distally or proximally relative to stationary portion 31 depending on the direction of rotation of drive gear 92. Translating portion 32 includes an end cover 38 that is attached with cross-bracket assembly 40 (shown in FIG. 3), such that cross-bracket assembly 40 translates longitudinally distally or proximally relative to stationary portion 31 (and thus relative to vehicle 20, shown in FIGS. 16A–C) along with translating portion 32. By combining one or more longitudinally telescoping assemblies 30 with the latitudinally extending receiver portion 50A (via cross-bracket 40), ballmount 60 and hitch ball 65 (shown in FIG. 1) can be moved to an infinite number of positions within a plane of defined boundaries.

Figure 5A:
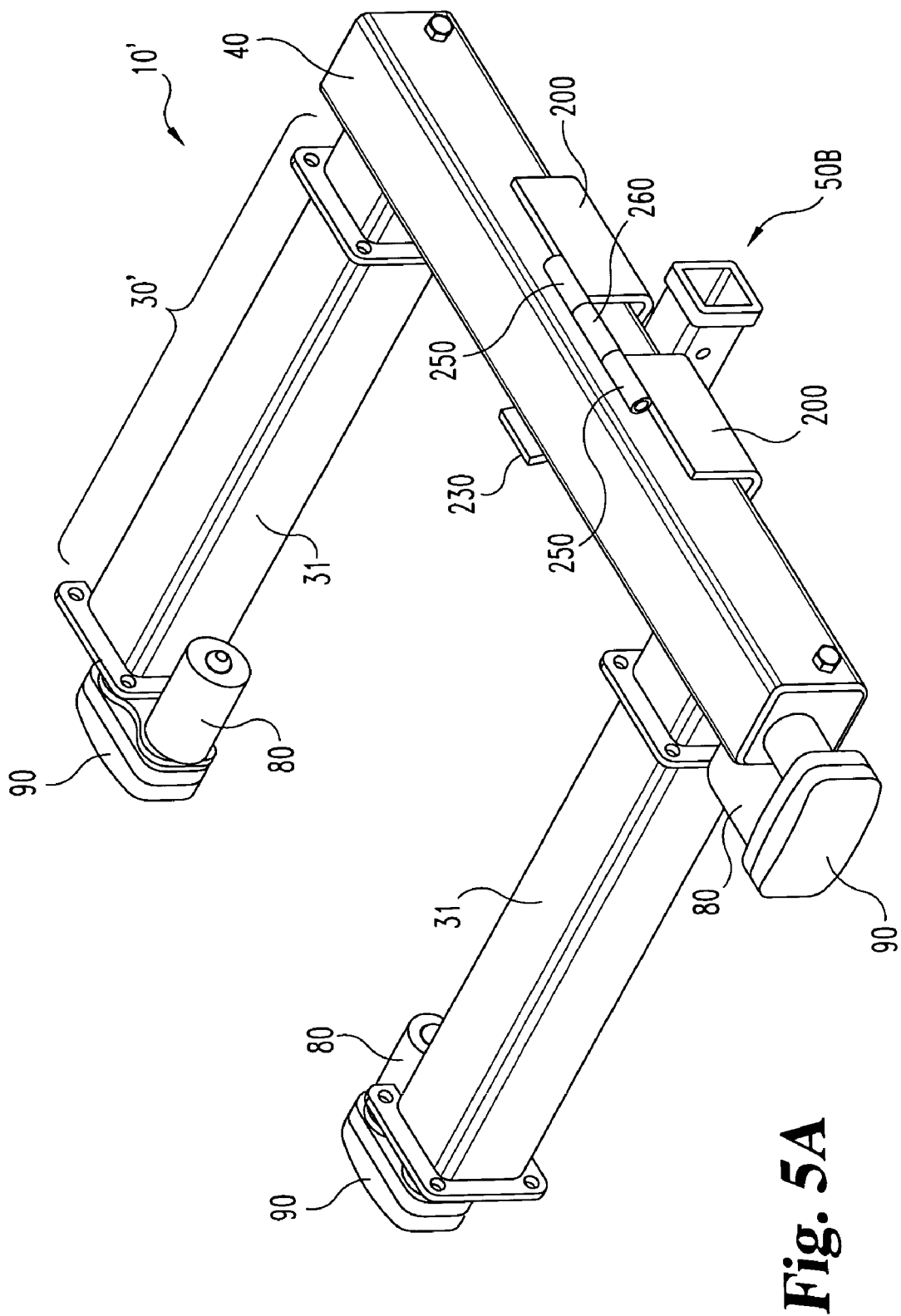
FIG. 5A is an isometric view of an adjustable trailer hitch assembly according to another embodiment of the invention, in the longitudinally retracted position.
Figure 5B:
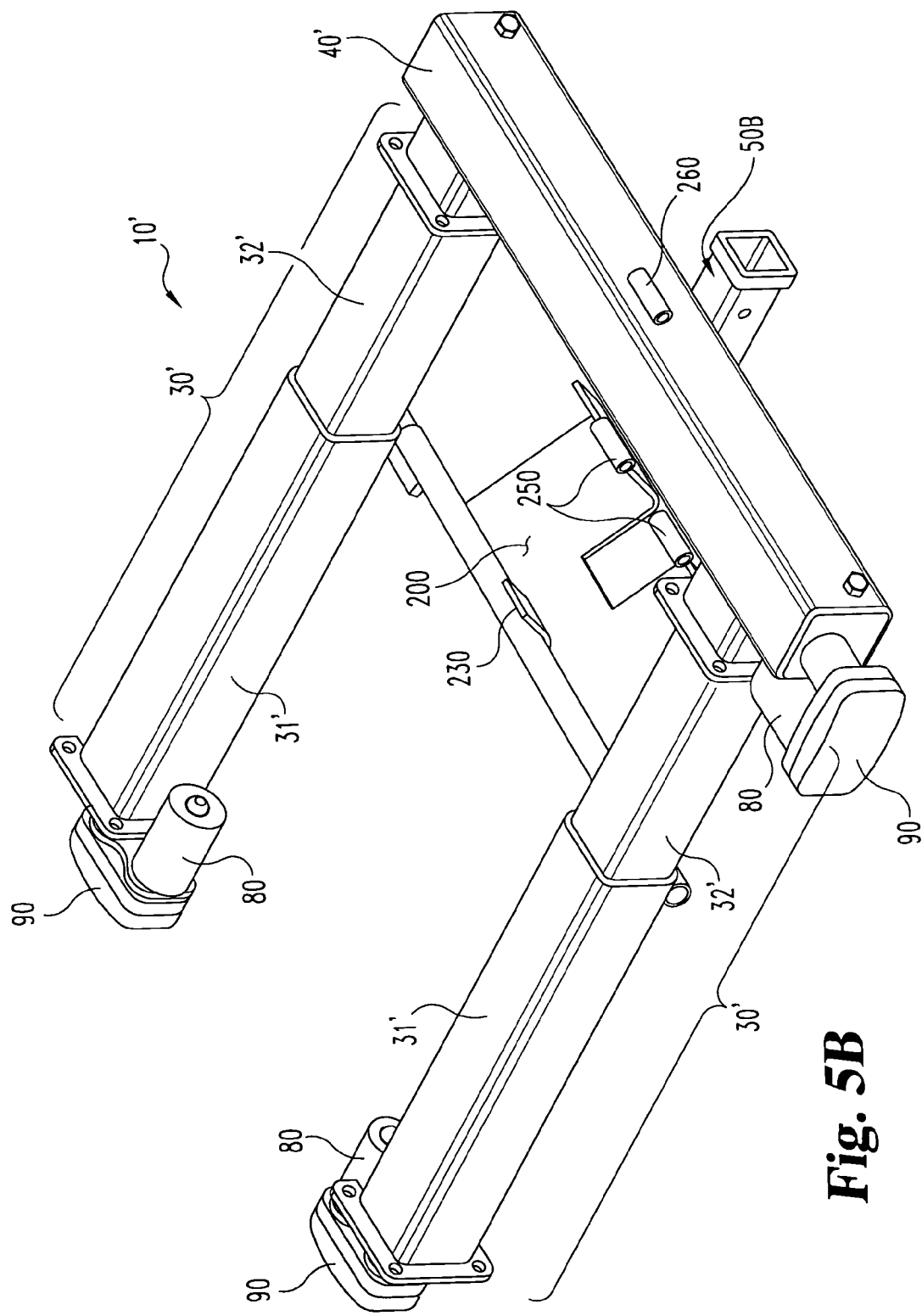
FIG. 5B is an isometric view of the adjustable trailer hitch assembly of FIG. 5A in the longitudinally extended position.
Figure 6:
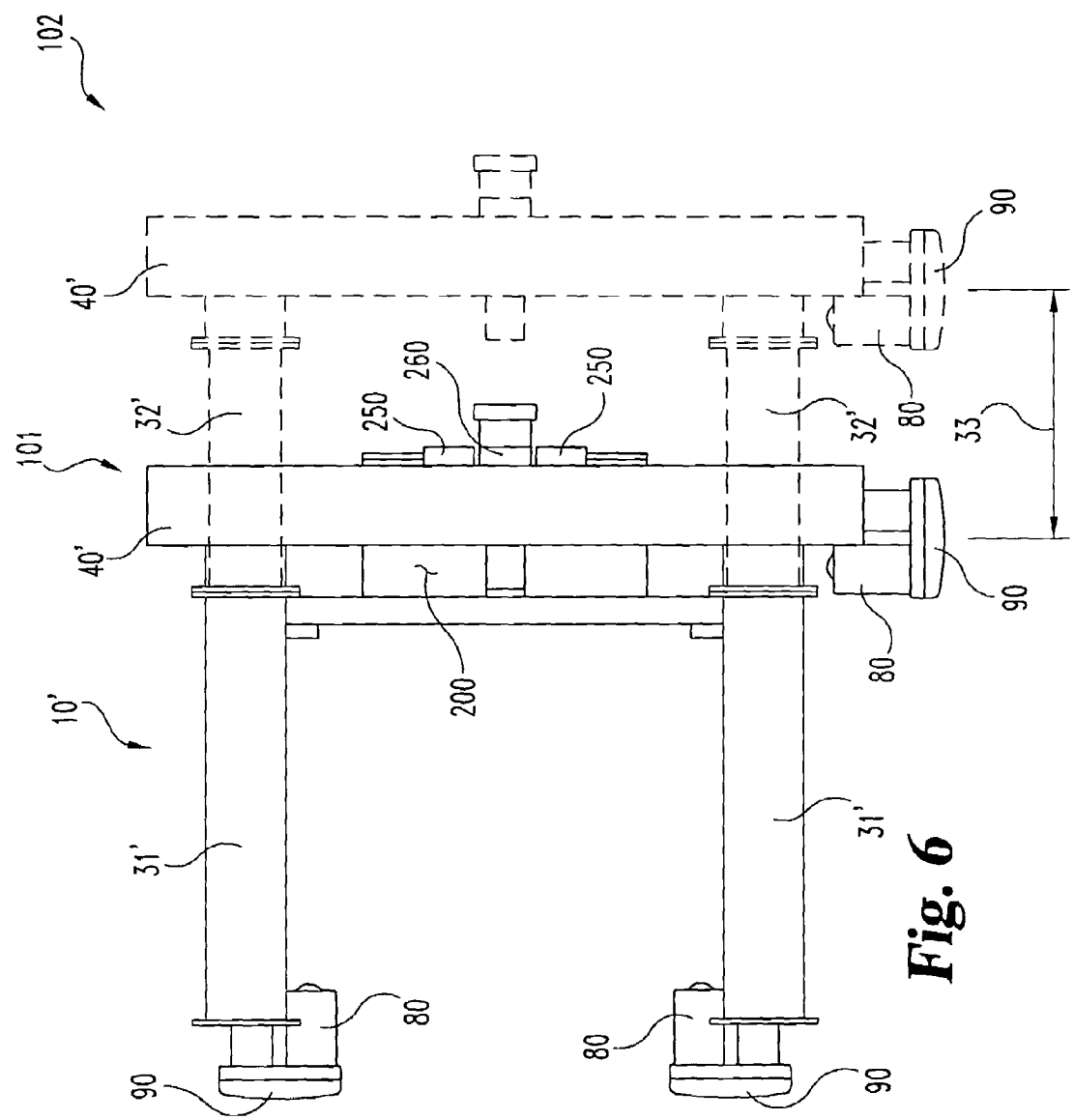
FIG. 6 is a top plan view of the adjustable trailer hitch assembly of FIG. 5A in the longitudinally retracted position (solid lines) and in the longitudinally extended position (dashed lines).
Figure 7:
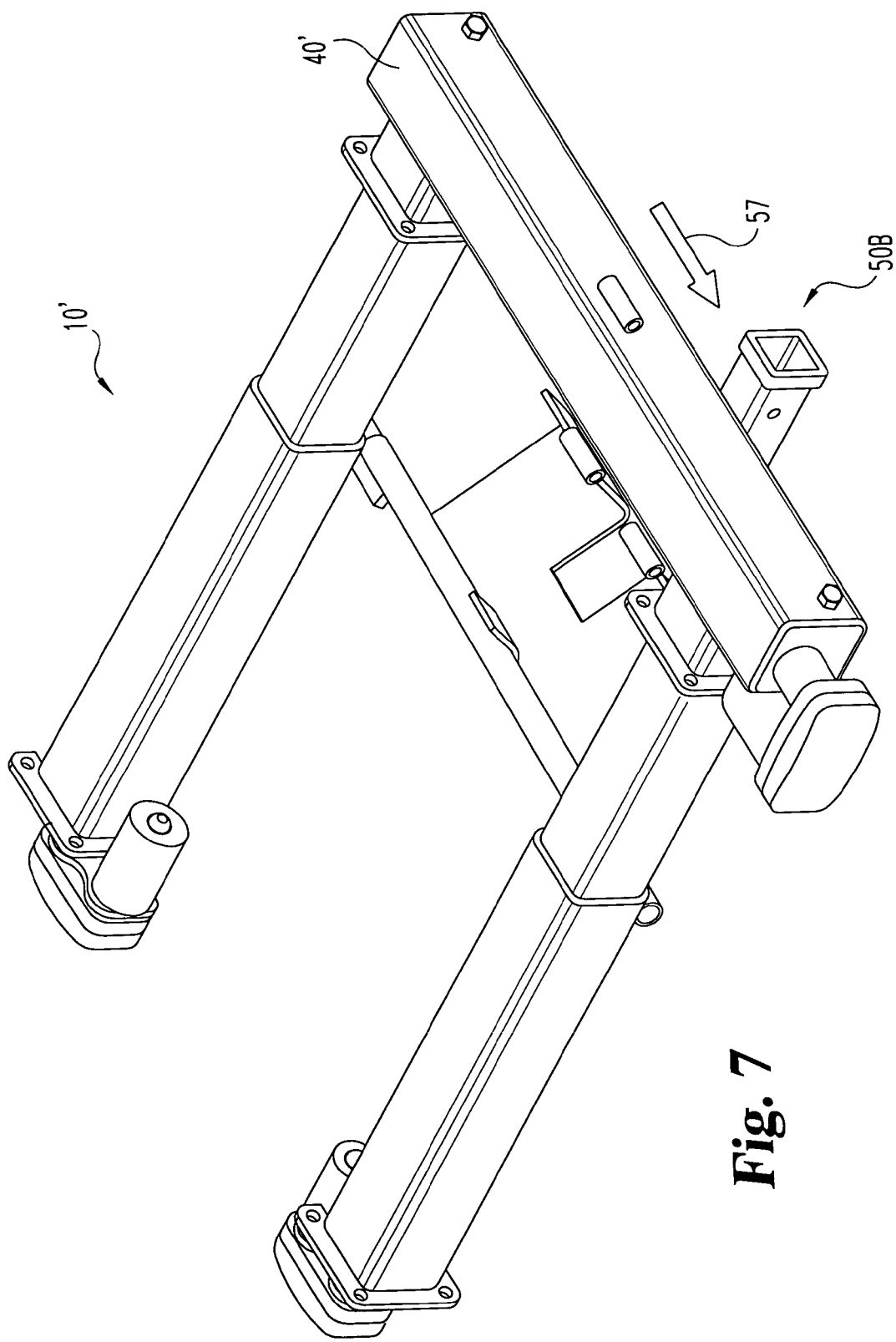
FIG. 7 is an isometric view of the adjustable trailer hitch assembly of FIG. 5A in the longitudinally extended position, and with the receiver translated latitudinally left.
Figure 8:
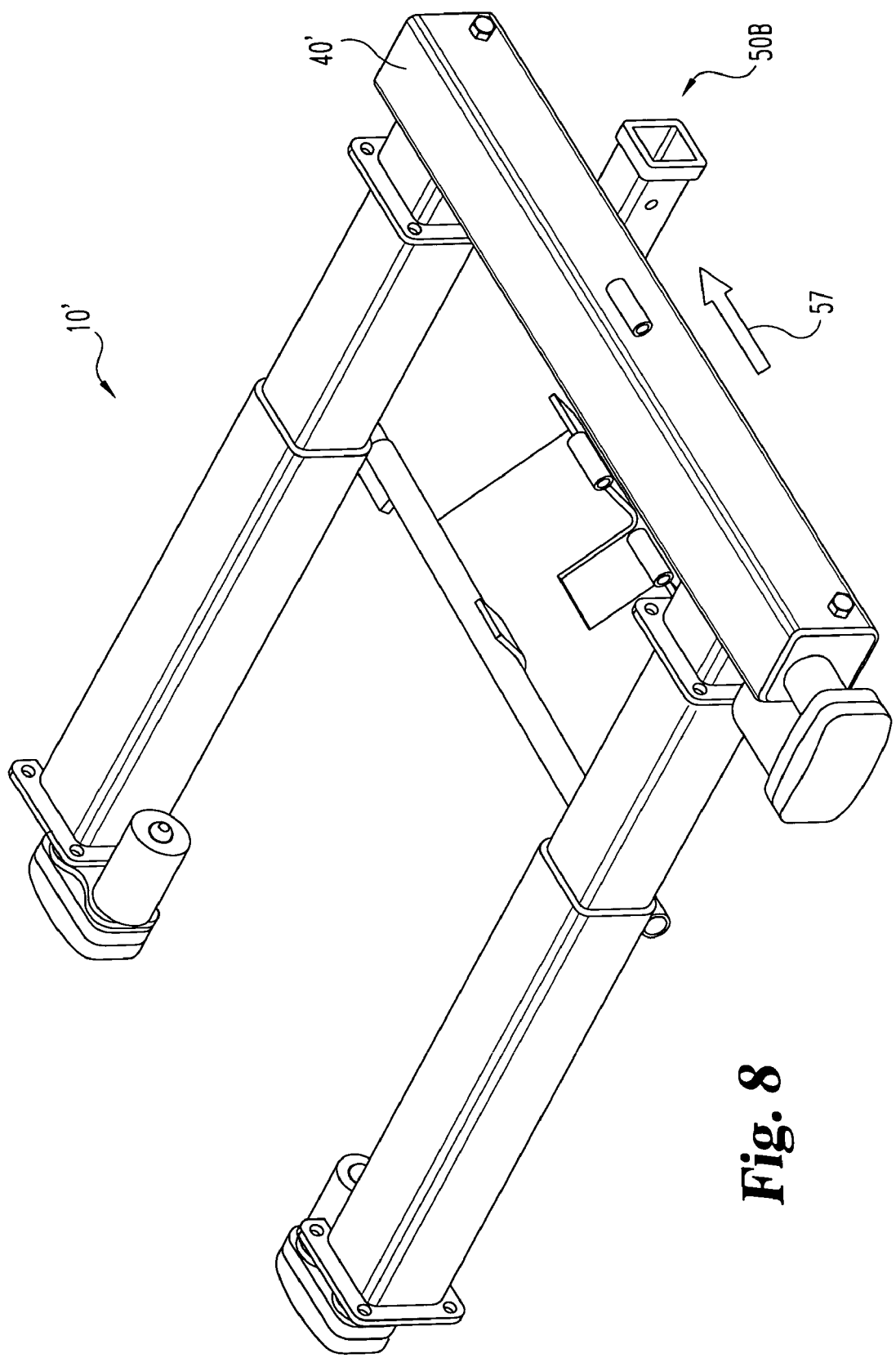
FIG. 8 is an isometric view of the adjustable trailer hitch assembly of FIG. 5A in the longitudinally extended position, and with the receiver translated latitudinally right.

FIG. 5A is an isometric view of an adjustable trailer hitch assembly 10' according to another embodiment of the invention. Unless otherwise specified, the embodiment of FIG. 5A shares the structure and functionality of previously discussed embodiments. FIG. 5A shows telescoping assemblies 30' fully retracted, whereas FIG. 5B shows telescoping assemblies 30' extended. FIG. 6 provides a top view of the adjustable trailer hitch assembly 10' of FIG. 5A, both longitudinally retracted 101 and extended 102 (dashed lines). FIGS. 7 and 8 show the adjustable trailer hitch assembly 10' of FIG. 5A with receiver portion 50B translated laterally left and right, respectively, as depicted by arrows 57. The longitudinal range of motion 33 (shown in FIG. 6) combined with the latitudinal range of motion 57 (shown in FIGS. 7 and 8) together define a plane within which a receiver 50B can be controllably positioned relative to a vehicle 20 (shown in FIGS. 16A–C).

Figure 9:
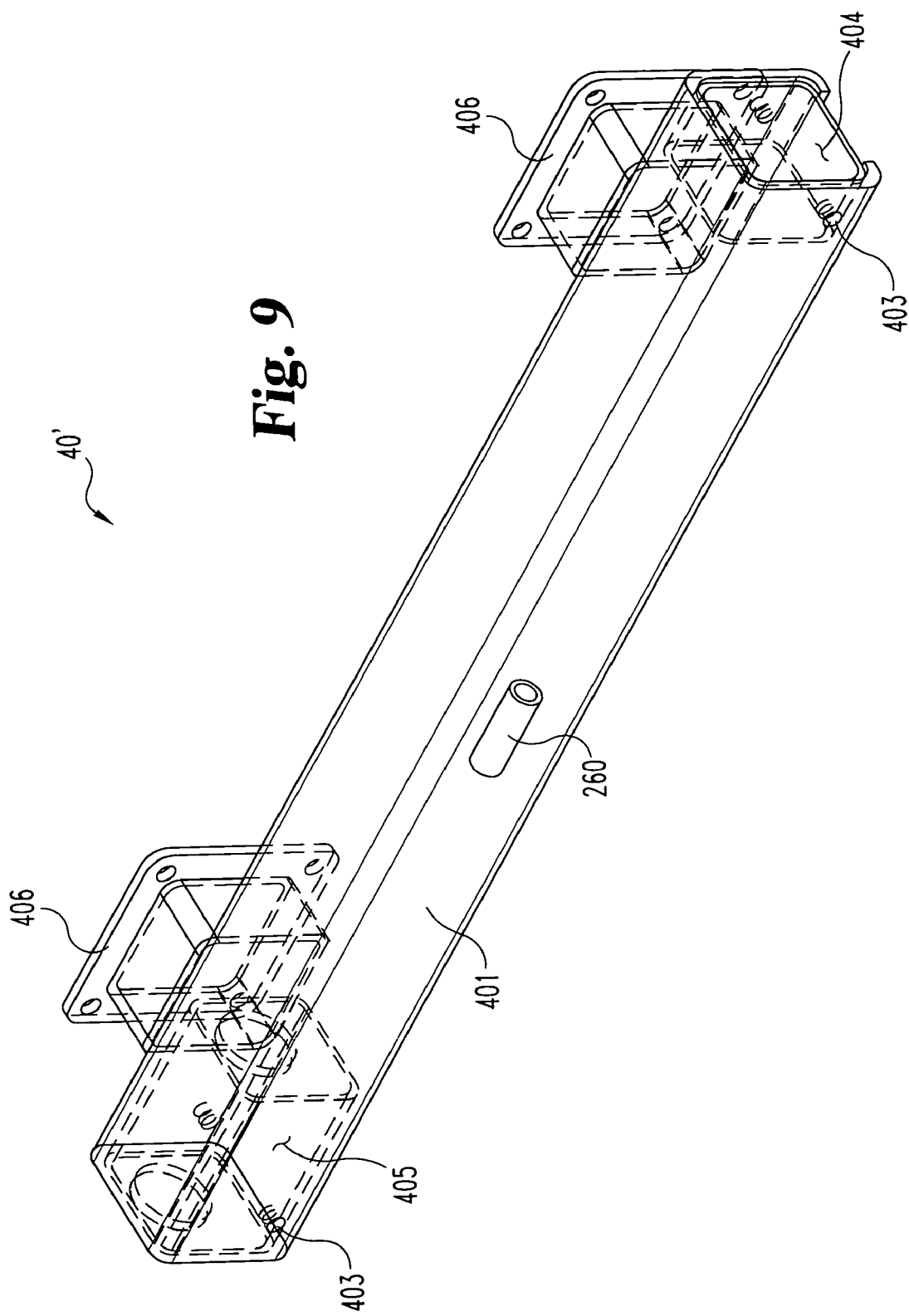
FIG. 9 is an isometric view of the cross-bracket assembly of the adjustable trailer hitch assembly of FIG. 5A.
Figure 10:
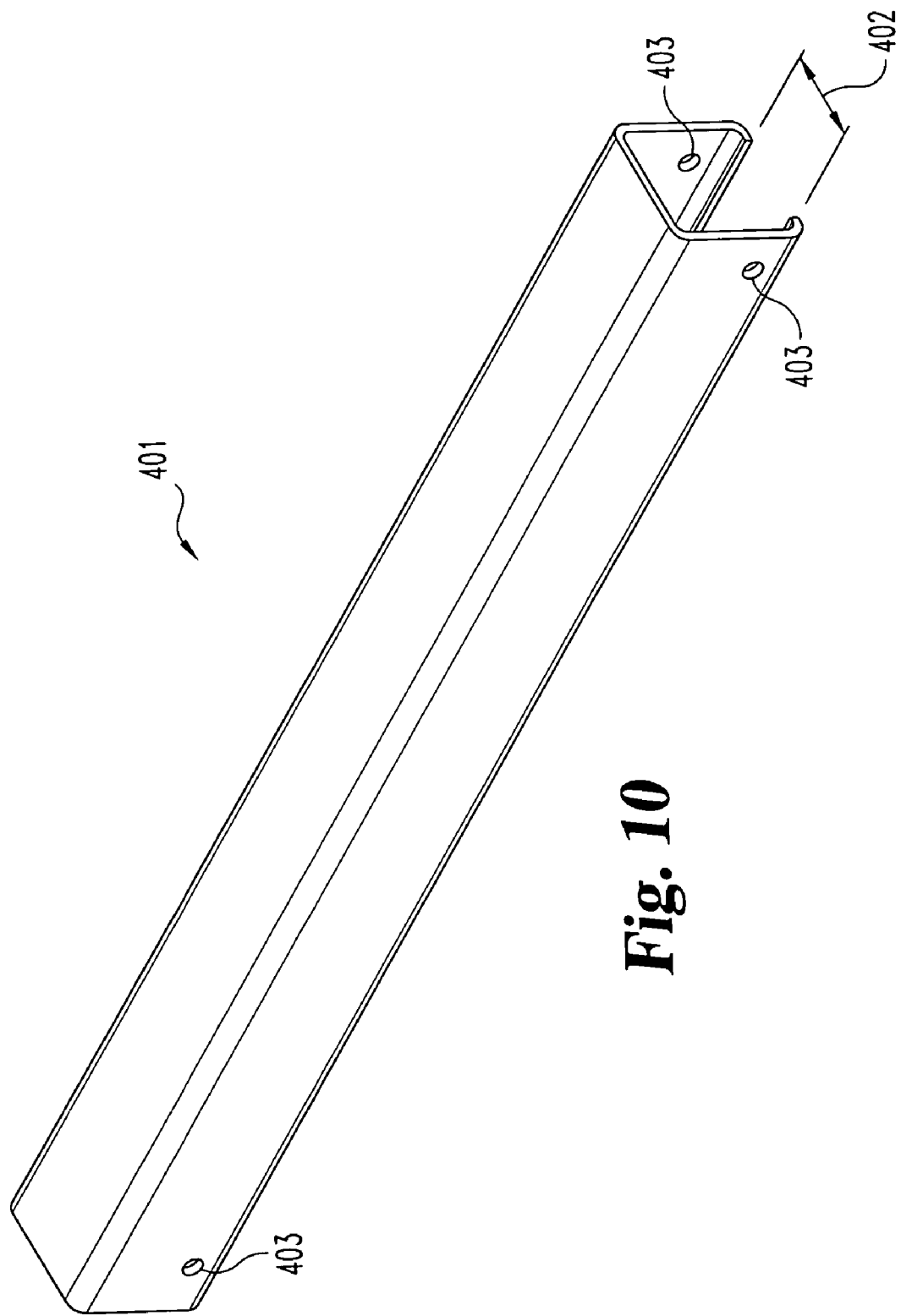
FIG. 10 is an isometric view of the main body of the cross-bracket assembly of FIG. 9.

FIG. 9 provides a detailed view of the cross-bracket assembly 40' of the adjustable trailer hitch assembly 10' of FIG. 5A. Cross-bracket assembly 40' comprises a body 401 (shown in FIG. 10) defining a slot 402 and fastener holes 403. Body 401 can be formed from any suitable material, such as 4 inch by 4 inch square steel tubing with ¼ inch wall thickness. Cross-bracket assembly 40' may include flanges 406 for attaching cross-bracket assembly 40' to telescoping assemblies 30' with suitable fasteners. Flanges 406 can be formed from any suitable material, such as 5½ inch wide ¼ inch thick steel plate, and can be welded to cross-bracket assembly 40'. Cross-bracket assembly 40' includes abutments 404, 405 (shown in FIG. 9) to limit the lateral travel of receiver portion 50B (shown in FIG. 5B) within cross-bracket assembly 40'. Abutments 404, 405 may be fastened within cross-bracket assembly 40' through fastener holes 403. Abutments 404, 405 may be formed from any suitable material, such as 3/16 inch wall thickness 3½ inch square steel tubing.

Figure 11:
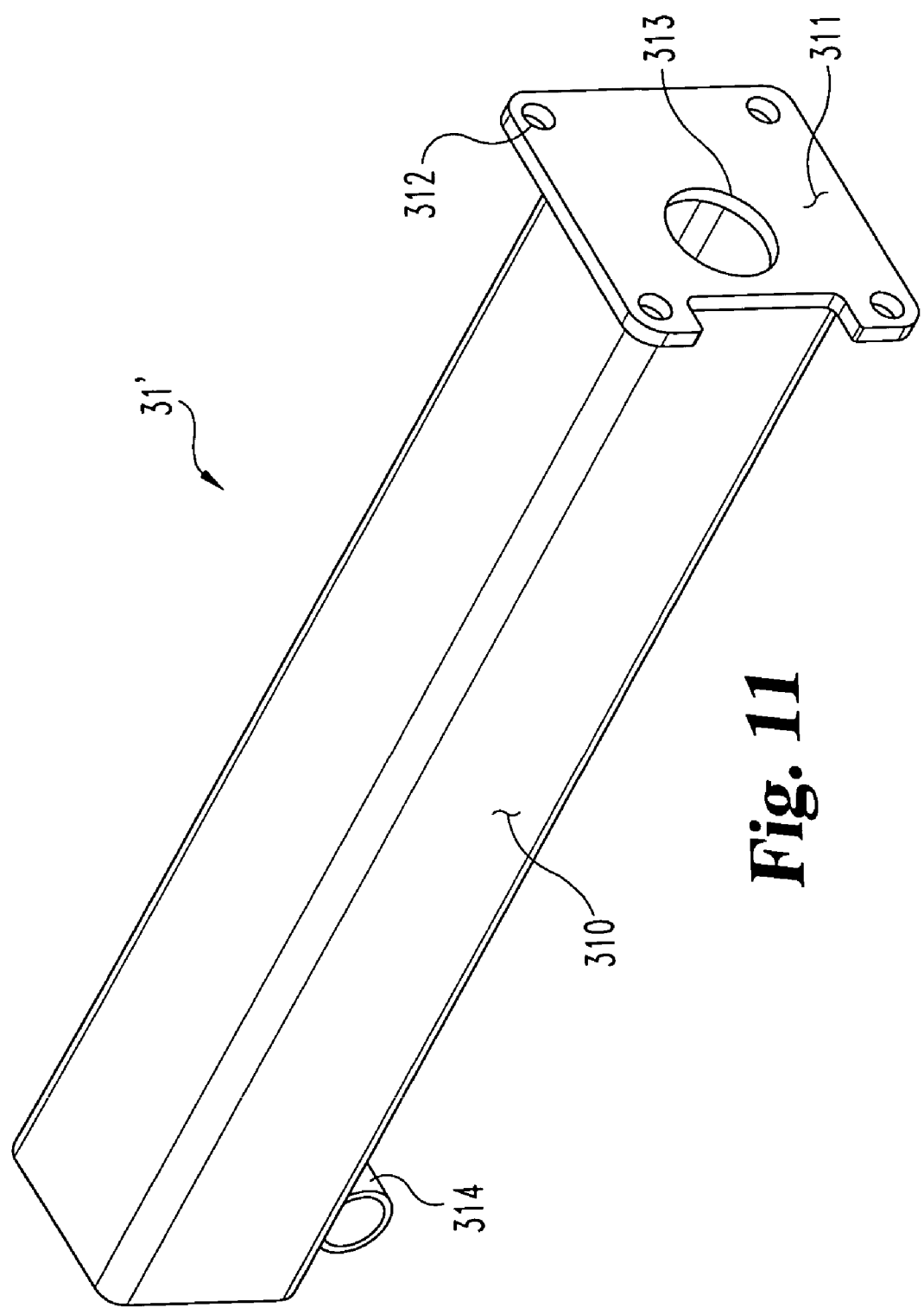
FIG. 11 is an isometric view of the stationary portion of the telescoping assembly of the adjustable trailer hitch assembly of FIG. 5A.

FIG. 11 shows a stationary portion 31' of telescoping assemblies 30' (shown in FIG. 5B). Stationary portions 31' are fixedly attached via brackets 35 (shown in FIG. 1) or other means to a vehicle 20 (shown in FIGS. 16A–C). Stationary portions 31' are formed from a longitudinally extending body 310, which can be formed from any suitable material, such as ¼ inch wall thickness 4 inch square steel tubing. Welded or otherwise attached to stationary portions 31' are brackets 314 to which safety latch 200 (discussed below) is pivotally attached. A flange 311 is provided on one end of each stationary portion 31' for mounting worm gear drives 90 and motors 80 (shown in FIG. 5B). Fastener holes 312 may be provided in flange 311 for fastening worm gear drives 90 and motors 80 to stationary portions 31', and one or more clearance holes 313 may be provided in flange 311 as necessary for the worm gear drives 90 and motors 80.

Figure 12:
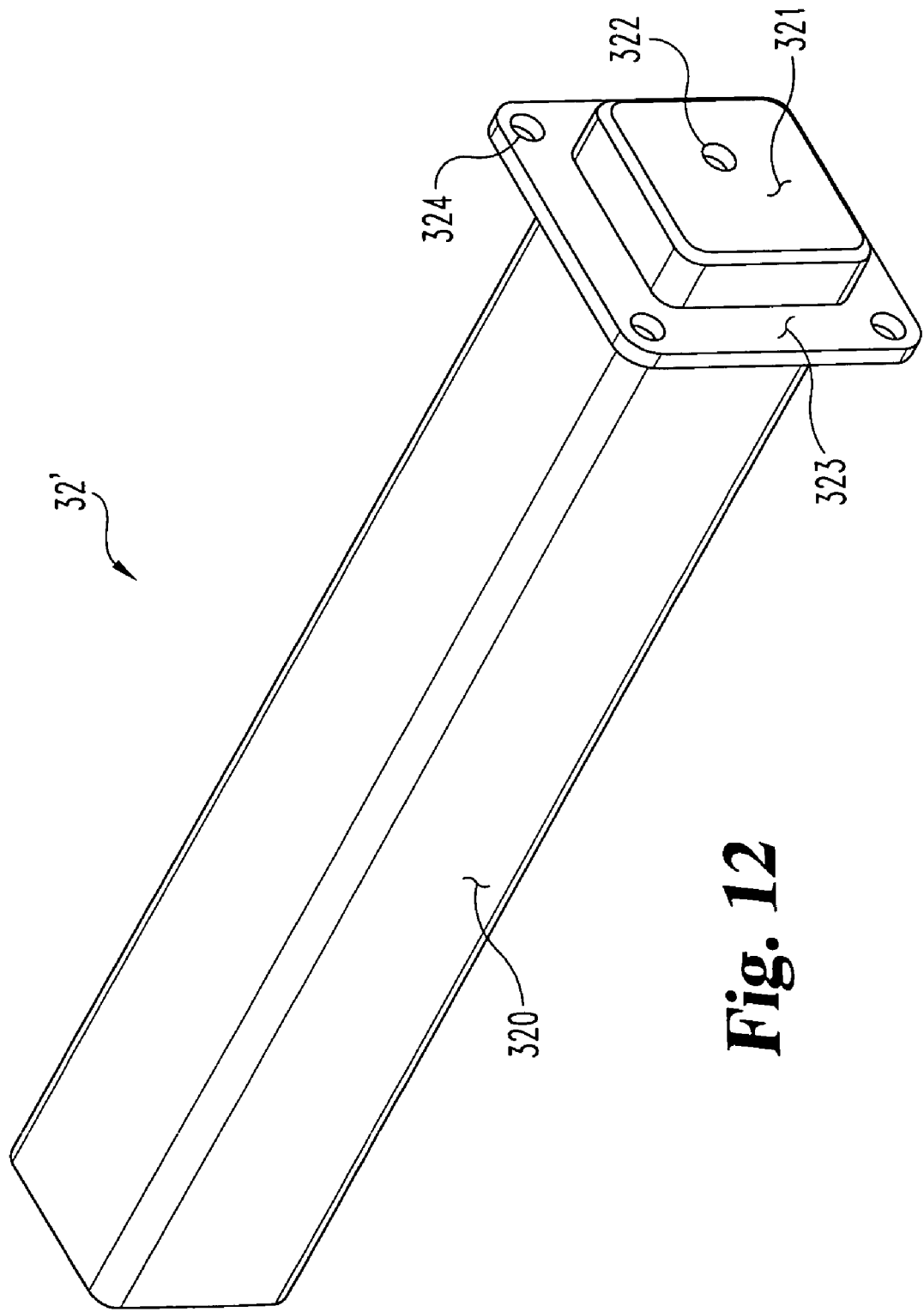
FIG. 12 is an isometric view of the translating portion of the telescoping assembly of the adjustable trailer hitch assembly of FIG. 5A.

FIG. 12 shows a translating portion 32' of telescoping assembly 30' (shown in FIG. 5B). Translating portions 32' slide into and are translatingly attached via worm gear drives (such as the mechanism shown in FIG. 4) to stationary portions 31' (shown in FIG. 11). Translating portions 32' are formed from a longitudinally extending body 320, which can be formed from any suitable material, such as 3/16 inch wall thickness 3½ inch square steel tubing. Welded or otherwise attached to translating portions 32' are flanges 323 for mounting translating portions 32' to the flanges 406 of cross-bracket assembly 40' (shown, e.g., in FIG. 6). Fastener holes 324 may be provided in flange 323 for fastening translating portions 32' to the flanges 406 of cross-bracket assembly 40', and one or more clearance holes 322 may be provided in flange 323 as necessary for the worm gear drives 90 and motors 80 (shown in FIG. 5B). In the embodiment shown in FIG. 12 flange 323 is positioned a short distance away from the end of the longitudinally extending body 320, thereby providing an interlocking male interface with flange 406 of cross-bracket assembly 40' (see FIG. 9).

Figure 13B:
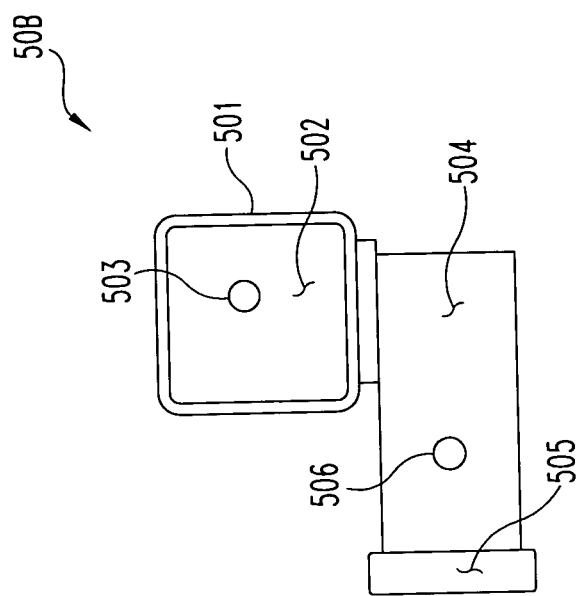
FIG. 13B is a left side view of the receiver portion of FIG. 13A.
Figure 13A:
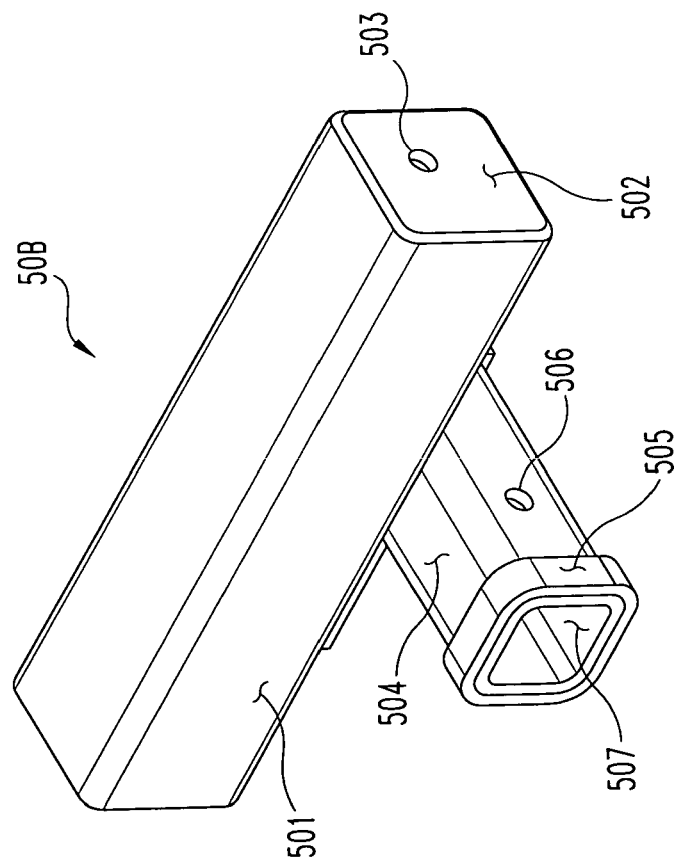
FIG. 13A is an isometric view of the receiver portion of the adjustable trailer hitch assembly of FIG. 5A.

FIG. 13A is an isometric view of the receiver portion 50B used in conjunction with the embodiment shown in FIG. 5A, and FIG. 13B is a right-side view of same. Receiver portion 50B comprises a latitudinally extending portion 501 that translates latitudinally within the body 401 of cross-bracket assembly 40' (shown in FIGS. 7–8). The latitudinally extending portion 501 may be formed from any suitable material, such as 3/16 inch wall thickness 3½ inch square steel tubing, and has one or more side plates 502 with one or more clearance holes 503 for clearing a worm drive gear 92 (shown in FIG. 3). Receiver portion 50B further comprises a receiving member 504 defining an opening 507 for slidably engaging a conventional ballmount 60 (shown in FIG. 1). Receiving member 55 further defines apertures 506 for receiving and removably engaging a conventional receiver pin 70 (shown in FIG. 1). Receiver portion 504 is fastened to latitudinally extending portion 501, for instance by welding.

Figure 15:
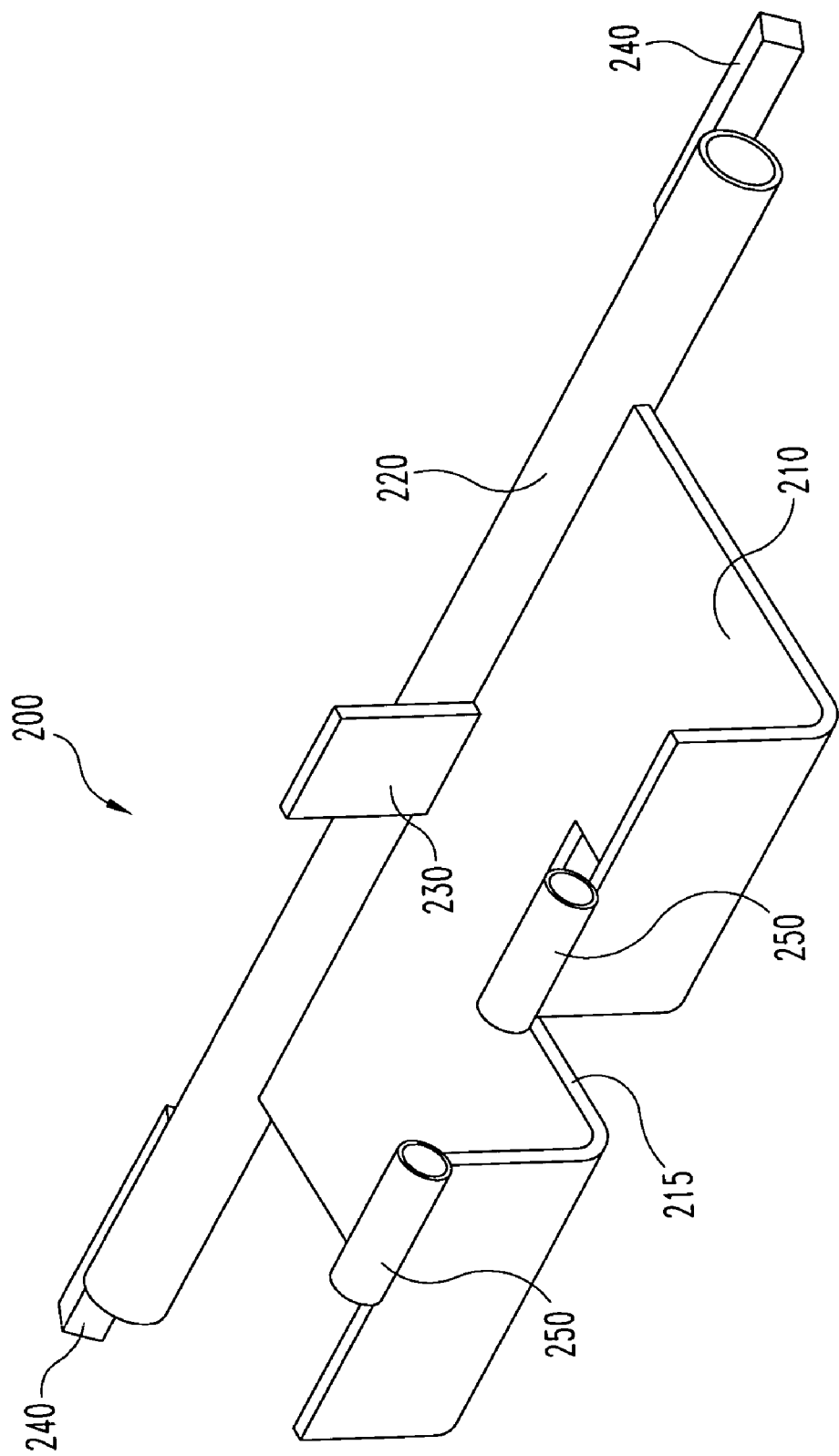
FIG. 15 is an isometric view of the safety latch of FIG. 14.

FIG. 14 is a side view of the adjustable trailer hitch assembly 10' of FIG. 5A, and depicts a safety latch 200 in both latched 201 and unlatched 202 (dashed lines) positions. Safety latch 200 is depicted separately in FIG. 15. Safety latch 200 may comprise a bent plate 210 adapted to wrap at least partially around cross-bracket assembly 40' to limit longitudinal movement of cross-bracket assembly 40' when safety latch 200 is in the latched position. Bent plate 210 can be formed from any suitable material, such as ¼ inch thick steel plate. Safety latch 200 may also define a recess 215 that at least partially surrounds receiver portion assembly 50B (shown in FIGS. 13A–B) when safety latch 200 is in the latched position to limit latitudinal movement of receiver portion assembly 50B (as shown in FIG. 5A). Pipe sections 250 are attached to safety latch 200, for instance by welding, and can be formed from ½ inch diameter steel pipe.

Safety latch 200 may pivot about a shaft 220 that is pivotally attached with adjustable trailer hitch assembly 10, with the angle through which safety latch 200 pivots limited by abutments 240, as shown in FIG. 14. For example, shaft 220 can be formed from 1 inch diameter steel pipe, and abutments 240 can be formed from 5/8 inch square steel bar. Safety latch 200 includes a plate 230 that contacts cross-bracket assembly 40' when cross-bracket assembly 40' is retracted, thus causing safety latch 200 to pivot toward the latched position when cross-bracket assembly 40' is retracted. When cross-bracket assembly 40' is fully retracted 101, safety latch 200 is pivoted toward the latched position 201, and pipe sections 250 attached to safety latch 200 can be aligned with pipe section 260 attached to cross-bracket assembly 40'. In the embodiments shown in FIGS. 13A–B, the receiver portion assembly 50B must be centered in cross-bracket assembly 40' before cross-bracket assembly 40' is retracted, so that receiver portion assembly 50B fits into recess 215 of safety latch 200. Once the pipe sections 250 and 260 are aligned, a safety pin 70 (shown in FIG. 1) can be assembled with pipe sections 250 and 260, thereby locking together safety latch 200 and cross-bracket assembly 40', and surrounding receiver portion assembly 50B with safety latch 200, as shown in FIG. 5A.

Figure 16A:
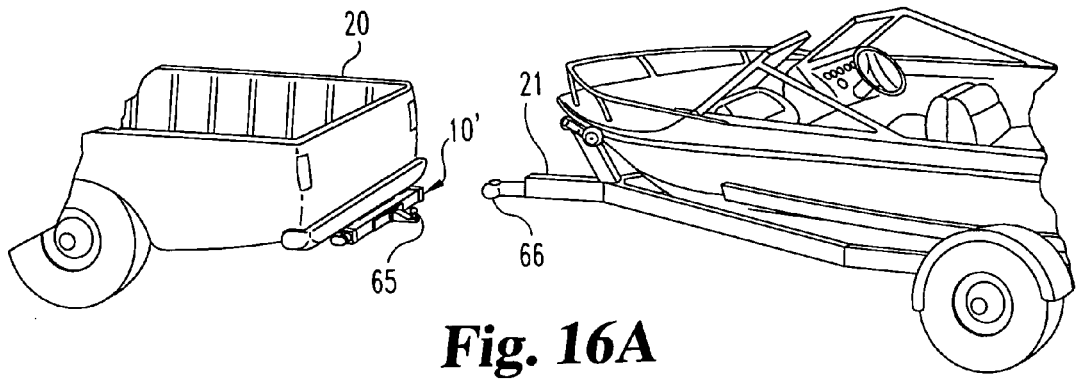
FIGS. 16A–C are isometric views of an adjustable trailer hitch assembly in use according to an embodiment of the invention.

An embodiment of an adjustable trailer hitch assembly 10 and/or 10' will now be described in use. As shown in FIG. 16A, a vehicle 20 with an adjustable trailer hitch assembly 10' attached thereto is moved adjacent a trailer 21. However, the hitch ball 65 may not be directly under the trailer tongue 66. Thus, the adjustable trailer hitch assembly 10 or 10' may be activated to translate the cross-bracket assembly 40' longitudinally toward the trailer tongue 66 to an extended position 33 (shown in FIG. 16B). Alternatively or in conjunction with longitudinal translation of cross-bracket assembly 40', the adjustable trailer hitch assembly 10 or 10' may be activated to translate receiver portion 50B laterally left or right, respectively, as depicted by arrow 57.

Figure 16B:
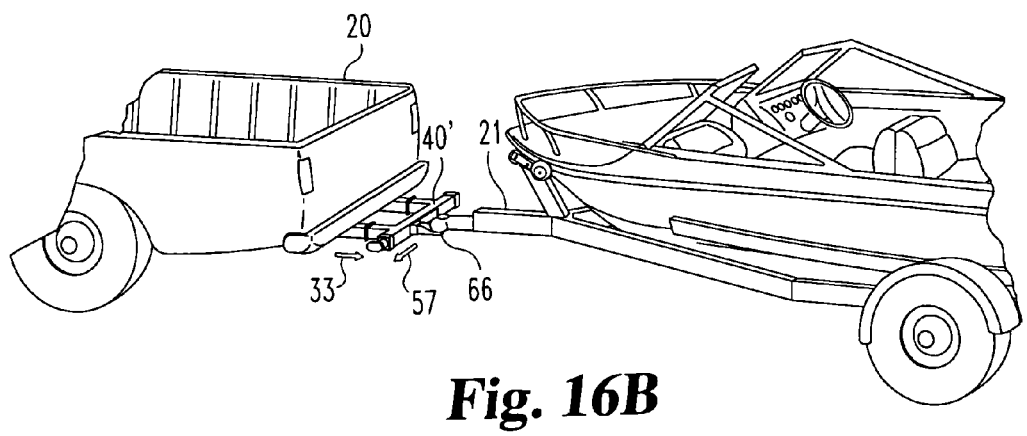
Figure 16C:
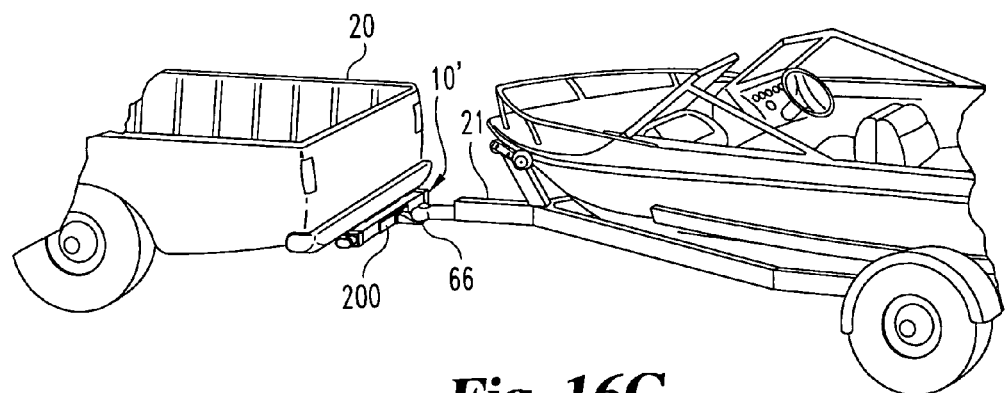

Once the adjustable trailer hitch assembly 10 or 10' has been controllably activated to position the hitch ball 65 beneath the corresponding trailer tongue 66, the trailer tongue 66 can be lowered onto and engaged with hitch ball 65, as shown in FIG. 16B. Once trailer tongue 66 is engaged with hitch ball 65, adjustable trailer hitch assembly 10 or 10' can be returned to a retracted and centered position by reversing the longitudinal and lateral movements described above. In one embodiment a single input, such as a reset button, causes the adjustable trailer hitch assembly 10 or 10' to automatically return to a retracted and centered position, as shown in FIG. 16C. The circuitry and algorithm necessary to provide such an automatic return feature are standard and need not be described. In one embodiment the adjustable trailer hitch assembly 10' includes a safety latch 200 that engages cross-bracket assembly 40' when the adjustable trailer hitch assembly 10' is centered and retracted. In this case the person may secure the safety latch 200 via a pin 70 (shown in FIG. 1) or some other suitable means.

While one embodiment of the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. Moreover, various details regarding the selection of materials and components, and fabrication and mounting of the adjustable trailer hitch assembly have been omitted, since such information would be known to one of ordinary skill in the art.

What is claimed is:

1. An adjustable trailer hitch, comprising:
   a longitudinally extending assembly comprising a stationary portion adapted to be fixed to a vehicle, and a translating portion translatingly attached to the stationary portion and adapted to translate longitudinally relative to the stationary portion;
   a first control mechanism operatively attached to the longitudinally extending assembly to controllably translate the translating portion longitudinally relative to the stationary portion;
   a latitudinal cross bracket assembly attached to the translating portion such that the latitudinal cross bracket assembly translates longitudinally when the translating portion translates longitudinally;
   a hitch receiver portion translatingly attached to the cross bracket assembly and adapted to translate latitudinally relative to the cross bracket assembly in the same plane as the extending assembly; and,
   a second control mechanism operatively attached to the receiver portion to controllably translate the receiver portion latitudinally relative to the cross bracket assembly.

2. The adjustable trailer hitch of claim 1 wherein the first control mechanism comprises a motor.

3. The adjustable trailer hitch of claim 1 wherein the second control mechanism comprises a motor.

4. The adjustable trailer hitch of claim 1 further comprising a motor operatively attached to one of the first control mechanism and the second control mechanism.

5. The adjustable trailer hitch of claim 4 further comprising a second motor attached to the other of the first control mechanism and the second control mechanism.

6. The adjustable trailer hitch of claim 1 wherein the longitudinally extending assembly is adapted to extend telescopically.

7. The adjustable trailer hitch of claim 1 wherein the longitudinally extending assembly comprises more than one translating portion.

8. The adjustable trailer hitch of claim 1 further comprising a controller operatively connected to at least one of the first control mechanism and the second control mechanism.

9. The adjustable trailer hitch of claim 1 wherein said longitudinally extending assembly further comprising a worm gear disposed between said stationary portion and said translating position.

10. The adjustable trailer hitch of claim 1 further comprising a worm gear operatively disposed between said latitudinally cross bracket assembly and said hitch receiver position.

11. The adjustable trailer hitch of claim 1 in which the first control mechanism transmits power through a first worm gear and the second control mechanism transmits power through a second worm gear.

12. The adjustable trailer hitch of claim 8, wherein the controller is band-held.

13. The adjustable trailer hitch of claim 12, wherein said first control mechanism and the second control mechanism are disabled when the controller is disconnected from said at least one of the first control mechanism and the second control mechanism.

14. The adjustable trailer hitch of claim 8 wherein said controller includes a cord selectively connectable to a receptacle on said cross-bracket assembly and wherein said control mechanisms are disabled when said cord is disconnected from said receptacle.

15. An adjustable trailer hitch, comprising:
   a longitudinally extending assembly comprising a stationary portion adapted to be fixed to a vehicle, and a translating portion translatingly attached to the stationary portion and adapted to translate longitudinally relative to the stationary portion;
   a first control mechanism operatively attached to the longitudinally extending assembly to controllably translate the translating portion longitudinally relative to the stationary portion;
   a latitudinal cross bracket assembly attached to the translating portion such that the latitudinal cross bracket assembly translates longitudinally when the translating portion translates longitudinally;

a hitch receiver portion translatingly attached to the cross bracket assembly and adapted to translate latitudinally relative to the cross bracket assembly;

a second control mechanism operatively attached to the receiver portion to controllably translate the receiver portion latitudinally relative to the cross bracket assembly; and a safety latch pivotally attached to the stationary portion, the safety latch including a portion adapted to contact the cross-bracket assembly when the cross-bracket assembly is refracted, said contact causing the safety latch to pivot toward a latched position.

16. The adjustable trailer hitch of claim 15, wherein the safety latch comprises a first pin receiving portion and the cross-bracket assembly comprises a second pin receiving portion, and the first pin receiving portion is aligned with the second pin receiving portion when the safety latch is in the latched position such that a pin can be engaged in both the first and second pin receiving portions.

17. An adjustable wailer hitch, comprising:

longitudinally extending means comprising stationary means adapted to be fixed to a vehicle, and translating means translatingly attached to the stationary means and adapted to translate longitudinally relative to the stationary means;

first control means operatively attached to the longitudinally extending means to selectively translate the translating means longitudinally relative to the stationary means;

latitudinal crass bracket means attached to the translating means such that the latitudinal cross bracket means translates longitudinally when the translating means translates longitudinally;

receiver means translatingly attached to the cross bracket means and adapted to translate latitudinally relative to the cross bracket means in the same plane as the longitudinally extending means; and, second control means operatively attached to the receiver means to selectively translate the receiver means latitudinally relative to the cross bracket means.

* * * * *

UNITED STATES PATENT AND TRADEMARK OFFICE
CERTIFICATE OF CORRECTION

PATENT NO. : 6,974,146 B2
DATED : December 13, 2005
INVENTOR(S) : Rodney Abair

It is certified that error appears in the above-identified patent and that said Letters Patent is hereby corrected as shown below:

Column 8,
Line 41, replace "band-held" with -- hand-held --.

Column 9,
Line 11, replace "refracted" with -- retracted --.
Line 20, replace "wailer" with -- trailer --.

Signed and Sealed this

Fourteenth Day of February, 2006

JON W. DUDAS
*Director of the United States Patent and Trademark Office*